(12) United States Patent
Venkataramani et al.

(10) Patent No.: US 12,468,947 B2
(45) Date of Patent: Nov. 11, 2025

(54) STICKIFICATION USING ANYWHERE PADDING TO ACCELERATE DATA MANIPULATION

(71) Applicant: INTERNATIONAL BUSINESS MACHINES CORPORATION, Armonk, NY (US)

(72) Inventors: Swagath Venkataramani, White Plains, NY (US); Vijayalakshmi Srinivasan, New York, NY (US); Shubham Jain, Elmsford, NY (US); Sarada Krithivasan, Chennai (IN); Sanchari Sen, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 17/814,782

(22) Filed: Jul. 25, 2022

(65) Prior Publication Data
US 2024/0028899 A1    Jan. 25, 2024

(51) Int. Cl.
*G06N 3/082* (2023.01)
*G06F 9/30* (2018.01)
*G06F 9/38* (2018.01)

(52) U.S. Cl.
CPC .......... *G06N 3/082* (2013.01); *G06F 9/3004* (2013.01); *G06F 9/3836* (2013.01)

(58) Field of Classification Search
CPC .................. G06F 9/3004; G06F 9/3836

USPC .......................................................... 706/62
See application file for complete search history.

(56) References Cited

U.S. PATENT DOCUMENTS

| | | | |
|---|---|---|---|
| 9,299,124 | B2 | 3/2016 | Chen et al. |
| 10,133,691 | B2 | 11/2018 | Brewer et al. |
| 10,644,723 | B2 | 5/2020 | Stainbrook et al. |
| 10,812,105 | B2 | 10/2020 | Park et al. |
| 10,904,058 | B2 | 1/2021 | Zhang et al. |
| 10,915,450 | B2 | 2/2021 | Brown et al. |
| 2019/0370631 | A1 | 12/2019 | Fais et al. |
| 2020/0192803 | A1 | 6/2020 | Sun et al. |
| 2020/0218985 | A1 | 7/2020 | Wei et al. |
| 2020/0250525 | A1 | 8/2020 | Addepalli et al. |
| 2020/0382239 | A1 | 12/2020 | Dikarev et al. |
| 2021/0056396 | A1 | 2/2021 | Majnemer et al. |
| 2024/0220768 | A1* | 7/2024 | Zhang ...................... G06N 5/01 |
| 2024/0370693 | A1* | 11/2024 | Zhang ...................... G06N 3/04 |

OTHER PUBLICATIONS

Faleiro, et al., "High performance multi-core transaction processing via deterministic execution", Ph.D. dissertation, Yale University, Dec. 2018 (Year: 2018).*

(Continued)

*Primary Examiner* — Tsu-Chang Lee
(74) *Attorney, Agent, or Firm* — Scott Dobson

(57) ABSTRACT

Embodiments are provided for efficient realization of memory-bound operations in a computing system by a processor. Data may be read from and written to a memory at a granular level using a stickification operation. One or more regions of activation and weight tensor data on the memory may be annotated by coupling the stickification operation with padding.

20 Claims, 9 Drawing Sheets

(56) References Cited

OTHER PUBLICATIONS

Faleiro et al., "Lazy Evaluation of Transactions in Database Systems", SIGMOD '14: Proceedings of the 2014 ACM SIGMOD International Conference on Management of Data, Jun. 2014, pp. 15-26, https://doi.org/10.1145/2588555.2610529 (12 pages).
Tahara, Daniel, "Scheduling Heuristics for Lazy Database Systems", Yale University Department of Computer Science, YALEU/DCS/TR-1488, May 2014, (7 pages).
Wang et al., "Parameterized Hardware Accelerators for Lattice-Based Cryptography and Their Application to the HW / SW Co-Design of qTESLA", IACR Transactions on Cryptographic Hardware and Embedded Systems, 2020(3), 269-306. https://doi.org/10.13154/tches.v2020.i3.269-306 (38 pages).
Alon et al., "Tight Bounds for Shared Memory Systems Accessed by Byzantine Processes", Distributed Computing, vol. 18, Issue 2, Dec. 2005, pp. 99-109, https://doi.org/10.1007/s00446-005-0125-8 (11 pages).
Sasaki et al., "Practical Byte-Granular Memory Blacklisting using Califorms", MICRO '52: Proceedings of the 52nd Annual IEEE/ACM International Symposium on Microarchitecture, 2019, pp. 558-571, https://doi.org/10.1145/3352460.3358299 (18 pages).

\* cited by examiner

STICKIFICATION USING ANYWHERE PADDING TO ACCELERATE DATA MANIPULATION

BACKGROUND

The present invention relates in general to computing systems, and more particularly, to various embodiments for providing stickification using anywhere padding to accelerate data manipulation on artificial intelligent hardware in a computing environment using a computing processor.

SUMMARY

According to an embodiment of the present invention, a method for providing stickification using anywhere padding to accelerate data manipulation on artificial intelligent hardware in a computing environment, by one or more processors, is depicted. Data may be read from and written to a memory at a granular level using a stickification operation. One or more regions of activation and weight tensor data on the memory may be annotated by coupling the stickification operation with padding.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments for automated evaluation of robustness of machine learning models under adaptive whitebox adversarial operation are provided.

DETAILED DESCRIPTION OF THE DRAWINGS

Figure 1:
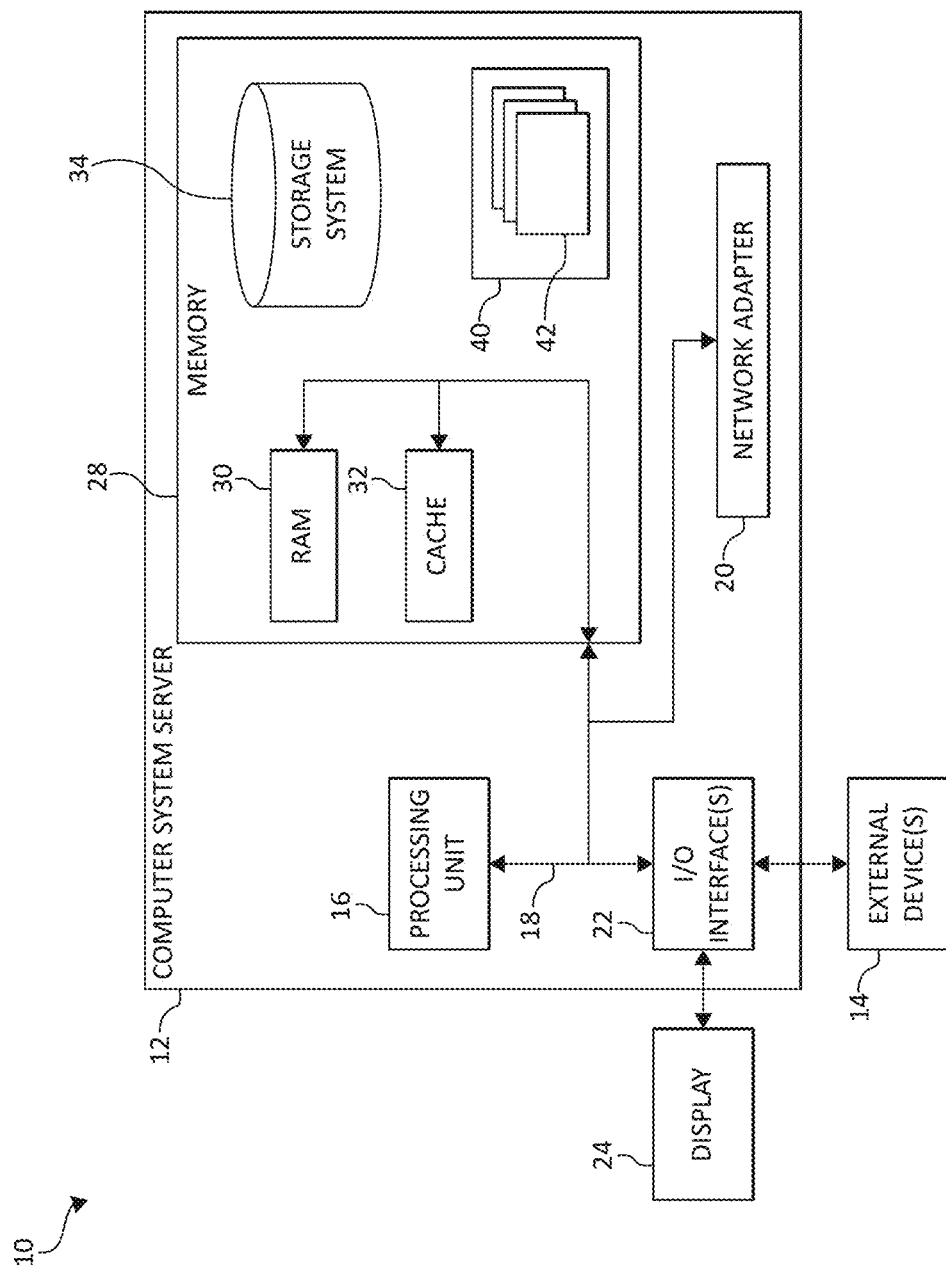
FIG. 1 is a block diagram depicting an exemplary cloud computing node according to an embodiment of the present invention.

The present invention relates generally to artificial intelligence and neural networks in a computing environment using a computing processor.

Deep learning is part of a broader family of machine learning methods based on learning data representations as opposed to task-specific algorithms. Some representations are loosely based on interpretation of information processing and communication patterns in a biological nervous system, such as neural coding that attempts to define a relationship between various stimuli and associated neuronal responses in the brain. Research attempts to create efficient systems to learn these representations from large-scale, unlabeled data sets.

Deep learning architectures such as deep neural networks, deep belief networks, and recurrent neural networks, have been applied to fields including computer vision, speech recognition, natural language processing, audio recognition, social network filtering, machine translation, and bioinformatics where they produced results comparable to, and in some cases superior to, human experts. Neural network (NN) based deep learning is a class of machine learning algorithms that use a cascade of many layers of nonlinear processing units for feature extraction and transformation. Each successive layer uses the output from the previous layer as input.

In machine learning, a convolutional neural network (CNN) is a type of feed-forward artificial neural network in which the connectivity pattern between its nodes (neurons) is inspired by the organization of the animal visual cortex, whose individual neurons are arranged to respond to overlapping regions tiling a visual field. Convolutional networks mimic biological processes and are configured as variations of multilayer perceptrons designed to use minimal amounts of preprocessing while processing data, such as digital images.

Convolutional neural networks (CNN) are networks with overlapping "reception fields" performing convolution tasks. A CNN is particularly efficient in recognizing image features, such as by differentiating pixels or pixel regions in a digital image from other pixels or pixel regions in the digital image. Generally, CNN is designed to recognize images or parts of an image, such as detecting the edges of an object recognized on the image.

Accordingly, various implementations are provided for stickification using anywhere padding to accelerate data manipulation on artificial intelligent hardware in a computing environment, by one or more processors, is depicted. Data may be read from and written to a memory at a granular level using a stickification operation. One or more regions of activation and weight tensor data on the memory may be annotated by coupling the stickification operation with padding.

It should be noted that, as used herein, "input values" include a sparse input value and a dense input value. "Weights" may be considered as sparse input values and the dense input values may be other data structure flowing along west to east in the systolic arrays. Also, "Input activations" may be considered as an example of dense input values.

In general, as used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations and/or machine learning models/machine learning pipelines, but there may be a variety of factors that may result in alternate suggestion of a combination of operations and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
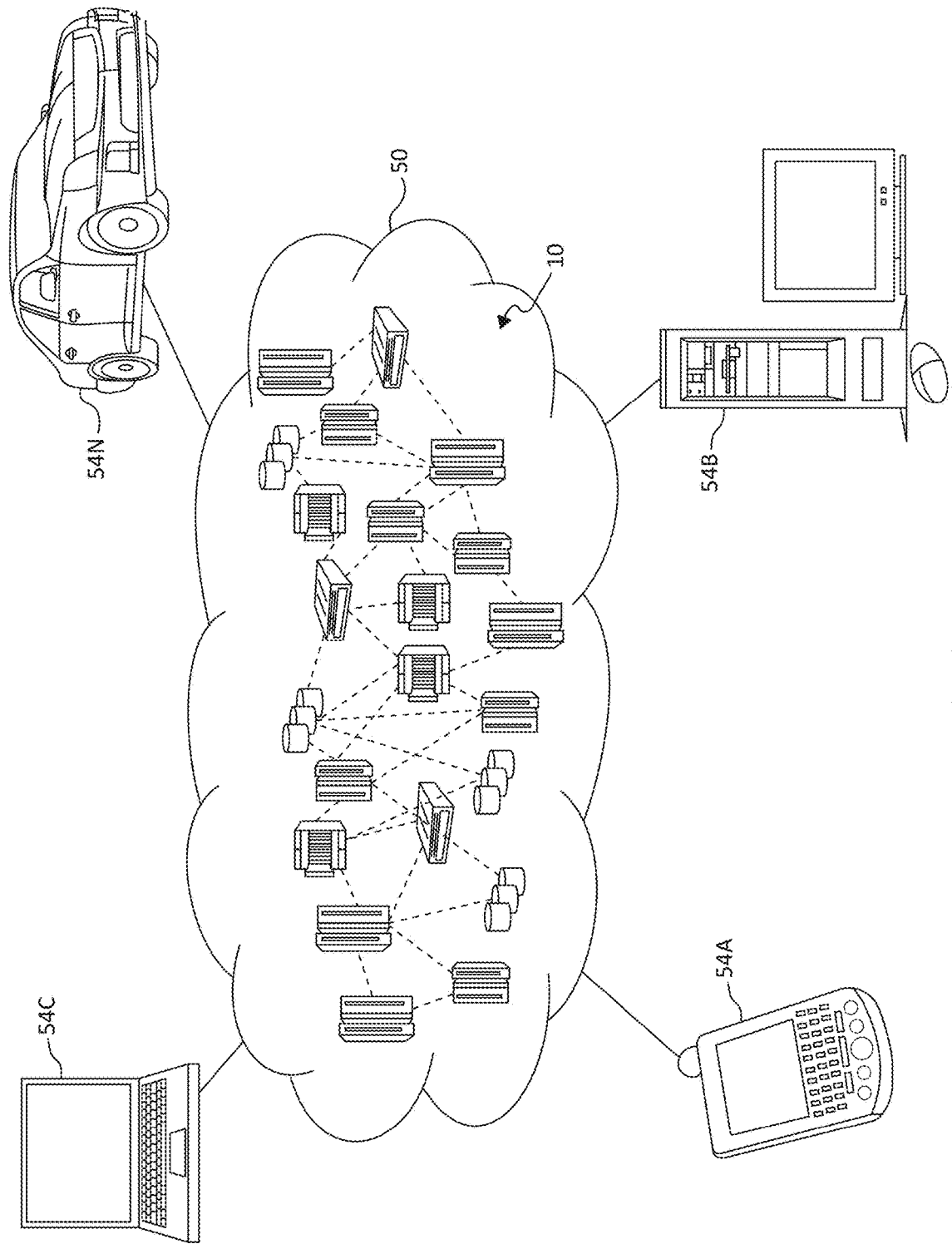
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
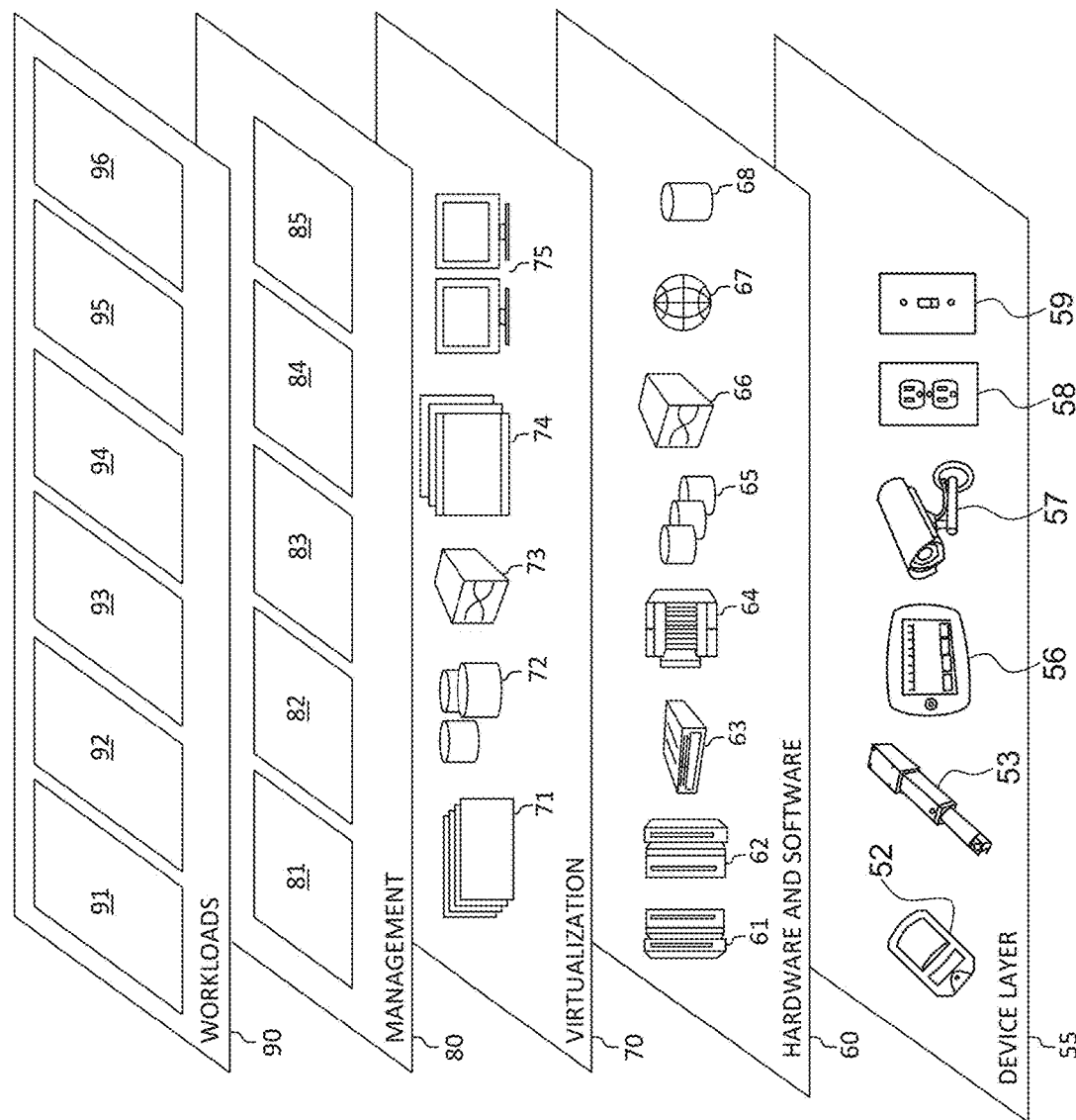
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing stickification using anywhere padding to accelerate data manipulation on artificial intelligent hardware in a computing environment (e.g., in a neural network architecture). In addition, workloads and functions 96 for providing stickification using anywhere padding to accelerate data manipulation on artificial intelligent hardware in a computing environment may include such operations as analytics, deep learning, and as will be further described, user and device management functions. One of ordinary skill in the art will appreciate that the workloads and functions 96 for providing stickification using anywhere padding to accelerate data manipulation on artificial intelligent hardware in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
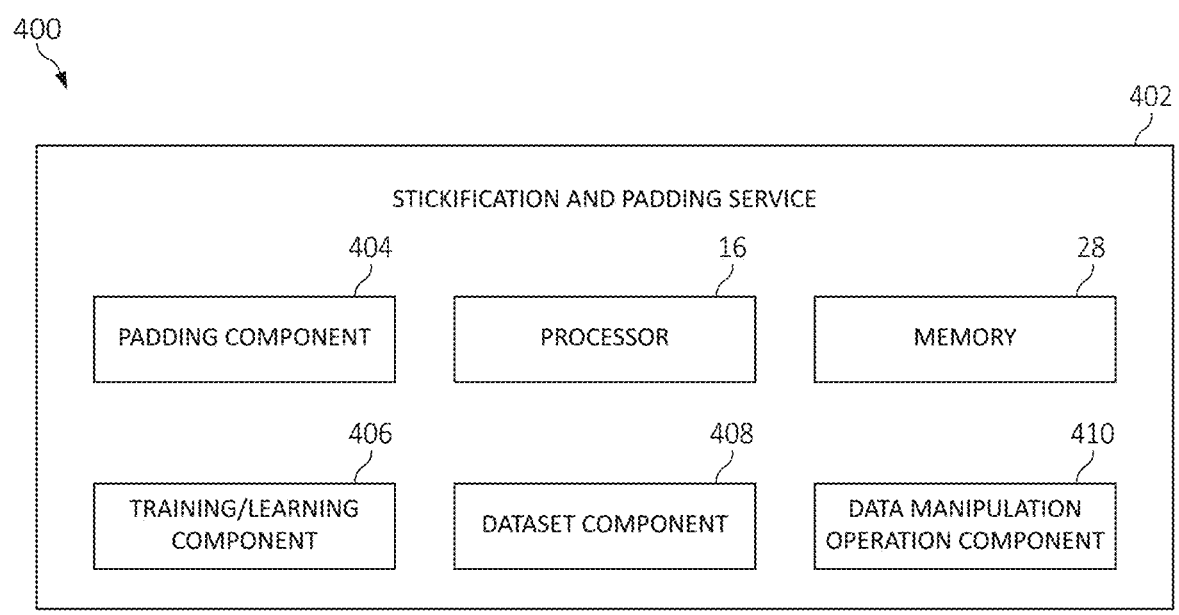
FIG. 4 is an additional block diagram depicting an exemplary functional relationship between various aspects of the present invention.

Turning to FIG. 4, a block diagram of various hardware 400 equipped with various functionality for providing stickification using anywhere padding to accelerate data manipulation on artificial intelligent hardware as will be further described is shown in which aspects of the mechanisms of the illustrated embodiments may be realized. In one aspect, one or more of the components, modules, services, applications, and/or functions described in FIGS. 1-3 may be used in FIG. 4.

For example, computer system/server 12 of FIG. 1 may be included in FIG. 4 and may be connected to other computing nodes over a distributed computing network, where additional data collection, processing, analytics, and other functionality may be realized. The components of computer system/server 12 may include, but are not limited to, one or more processors or processing units 16 ("processor") and/or a system memory 28.

The computer system/server 12 of FIG. 1, may include stickification and padding service 402, along with other related components in order to providing visualization and exploration of probabilistic models. The probabilistic model visualization and exploration service In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

The computer system/server 12 of FIG. 1, may include stickification and padding service 402, along with other related components in order to providing visualization and exploration of probabilistic models. The stickification and padding service 402 may provide visualization and exploration of probabilistic models.

The stickification and padding service 402 may include a padding component 404, a training/learning component 406, a dataset component 408, and a data manipulation operation component 410. The stickification and padding service 402, in association with the padding component 404, the training/learning component 406, the dataset component 408, and the data manipulation operation component 410, may read or writing data from a memory at a granular level using a stickification operation; and annotate regions of activation and weight tensor data on the memory by coupling the stickification operation with padding.

The stickification and padding service 402, in association with the padding component 404, the training/learning component 406, the dataset component 408, and the data manipulation operation component 410, may unstick one or more inputs of a tensor; and restick the one or more inputs of the tensors.

The stickification and padding service 402, in association with the padding component 404, the training/learning component 406, the dataset component 408, and the data manipulation operation component 410, may divide one or more tensors in one or more of a plurality of dimensions.

The stickification and padding service 402, in association with the padding component 404, the training/learning component 406, the dataset component 408, and the data manipulation operation component 410, may provide a padded region to be spread in a plurality of dimensions on a data stick.

The stickification and padding service 402, in association with the padding component 404, the training/learning component 406, the dataset component 408, and the data manipulation operation component 410, may transpose a tensor by shuffling a plurality of dimensions on a data stick, wherein the data stick format is unaltered.

The stickification and padding service 402, in association with the padding component 404, the training/learning component 406, the dataset component 408, and the data manipulation operation component 410, may reshape one or more dimensions of the tensor into a single dimension or a plurality of dimensions.

The stickification and padding service 402, in association with the padding component 404, the training/learning component 406, the dataset component 408, and the data manipulation operation component 410, may squeeze a dimension of a tensor having a size equal to a defined value.

Figure 5:
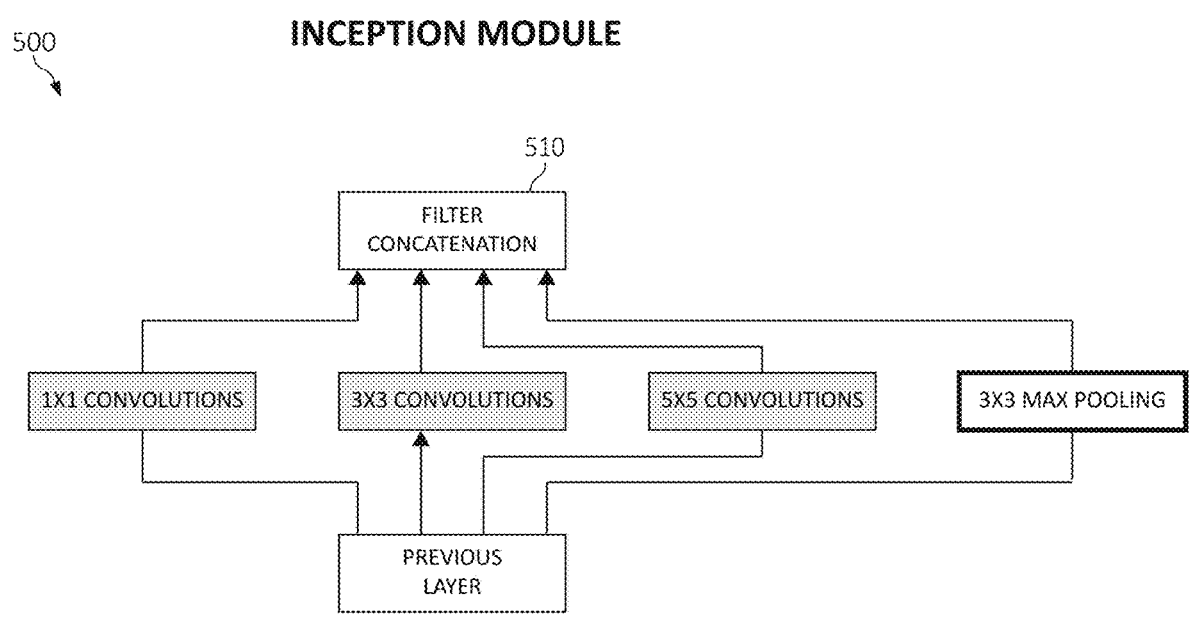
FIG. 5 is a block diagram depicting an inception module for stickification using anywhere padding to accelerate data manipulation on artificial intelligent hardware in a computing environment according to an embodiment of the present invention.

For further explanation, FIG. 5 is a block diagram depicting an inception module 500 for stickification using anywhere padding to accelerate data manipulation on artificial intelligent hardware in a computing environment according to an embodiment of the present invention. In one aspect, one or more of the components, modules, services, applications, and/or functions described in FIGS. 1-4 may be used in FIG. 5. As will be seen, many of the functional blocks may also be considered "modules" or "components" of functionality, in the same descriptive sense as has been previously described in FIGS. 1-5. Repetitive description of like elements employed in other embodiments described herein is omitted for sake of brevity.

As depicted, FIG. 5 depicts and an inception module 500 having different stacked towers use that may be used in convolutional neural networks ("CNN") to allow for more efficient computation and deeper networks through dimensionality reduction with stacked 1×1 convolutions. The modules were designed to solve the problem of computational expense, as well as overfitting, among other issues. The inception module 500 uses a 1×1, 3×3, 5×5 convolution and 3×3 max-pooling performed in a parallel way at the input, and the output of these are stacked together to generate the final output. The convolution filter 510 of the inception module 500 may be used to concatenate tenors of different sizes and will process objects at multiple scales better.

Thus, the present invention may perform a variety of data operations, which are described as follows. Also, the notation of "stickification" is generalized herein to handle/process data manipulation operations.

In some implementations, the present invention may concatenate tensors along a given "axis" dimension. The tensors may be split along a given "axis" dimension. Similar to a concatenation operation, the present invention may stack or pack the tensors (e.g, stack or pack the tensors along a given "axis" dimension) except all input tensors have length of "1" ("Len=1") in the "axis" dimension Similar to the split operation, the present invention may provide for unstacking or unpacking, except the tensors after splitting, have length of "1" ("Len=1") in the "axis" dimension. A transpose operation may be performed by shuffling (even non-contiguous) dimensions in the tensor. A reshape operation may be used to fuse tensor dimensions ("dims") into a single dimension or split the tensor dimensions ("dims") into multiple dimensions. A squeeze operation may be performed to drop tensor dimensions ("dims") whose size equals 1 (which may be a special case of reshape). A gather operation may be used to elect n−k dimensional slices from an n dimension tensor using a k dimension index vector (typically k=1).

For example, current stickification operations may stickify a data stick ("D-stick") tensors such as, for example, tensor's [E4][E3][E2][E1] stickified to [E4][E1/64][E3][E2/32] (e.g., "{[32][64]}"). The stickified tensor is padded with zeros (or any desired value) at the end of the stick and super-stick dimensions to make them a multiple of 64 and 32 respectively. It should be noted that stickification of the tensor is indicated by using a [Valid,Pad] tuple for each dimension. Thus, in this example, E4 points to (E4,0) and the zero indicates there is no padding as E4 is neither stick or super stick. E3 points to (E3,0) and the zero indicates no padding as E3 is neither stick or super stick. E2 points to (E2, 32−E2% 32) and there is padding of (32−E2% 32) at the end of superstick. E1 points to (E1, 64−E1% 64) and there is padding of (64−E1% 64) at the end of stick.

Figure 6:
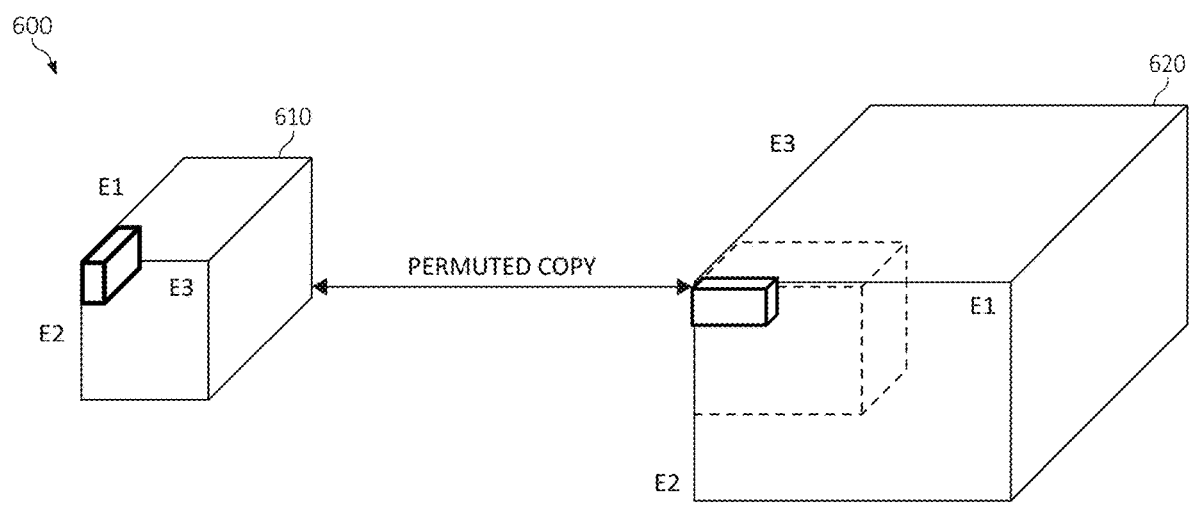
FIG. 6 is an additional block diagram depicting generation of a permuted copy for stickification using anywhere padding to accelerate data manipulation on artificial intelligent hardware according to an embodiment of the present invention.

For further explanation, FIG. 6 is a block diagram 600 depicting generation of a permuted copy for stickification using anywhere padding to accelerate data manipulation on artificial intelligent hardware according to an embodiment of the present invention. In one aspect, one or more of the components, modules, services, applications, and/or functions described in FIGS. 1-5 may be used in FIG. 6. As will be seen, many of the functional blocks may also be considered "modules" or "components" of functionality, in the same descriptive sense as has been previously described in FIGS. 1-5. Repetitive description of like elements employed in other embodiments described herein is omitted for sake of brevity.

As depicted, FIG. 6 depicts a block diagram for handling data manipulations operations. In some implementations, a Naïve CPU implementation may be provided by 1) unstickify the inputs of the tensors, 2) execute data manipulations operations on the CPU, and 3) restickify based on consumer requirements. However, such performance is suboptimal and may be selected as a back-up option. Accordingly, the present invention may provide an efficient realization of memory-bound operations for providing stickification using anywhere padding to accelerate data manipulation on artificial intelligent hardware. In one aspect, present invention may provide data manipulations operations on artificial intelligent hardware (e.g., "zAIU") while preserving stickification. In one aspect, one or more boundary conditions of a tensor (e.g., having E1, E2, E3) of a data stick 610 are isolated and executed on CPU by creating a sub-tensor copy in a library 610. That is, the library (e.g., STC+DP library) in a super-stick 620 provides a sub-tensor copy with dimension permute (STC+DP). Similar tensor dimensions may be selected for the data stick and super-stick 620 for input and output.

Thus, the following data manipulations may be executed using the various embodiments described in FIG. 6.

For operations of concatenation ("concat", stacking ("stack"), and packing ("pack"), if there is no concatenation "axis", the tensor dimension is an outermost and not a data stick dimension, but can be turned into a NOP with the concatenated tensor volume being allocated in memory and the output tensor base address of the operations may be offset producing each input (portion of concatenated tensor).

In some implementations, if concatenation "axis" dimension is an inner dimension but not a stick dimension, the STC+DP library can be used to place each input in the correct position within the concatenated volume (no dimension permute necessary). If concatenation axis anywhere in the layout and is a stick dimension, the following may apply by providing stickification using anywhere padding to accelerate data manipulation on artificial intelligent hardware. For example, assume the concatenation dimension is E1 and input 1 is E1=100 and (Valid, Pad) is equal to (100,28) and input 2 is E1=50 and the (Valid, Pad) is (50,14). Assume the desired output is E1=150 and the (Valid, Pad) is (150,42). Since, E1 has a padding of 28, the present invention may move elements from a data stick of input 2 into the data stick of input 1 (e.g., a costly operation that is an intra-stick manipulation operations). Instead, the present invention may provide stickification using anywhere padding to accelerate data manipulation on artificial intelligent hardware by enhancing the notion of stickification to allow for a padded ("pad") region to be spread across anywhere in the dimension (e.g., volume) of the data stick and not just at the end of the dimension. The output stickification is a vector of (Valid,Pad) values are E1=150 and the (Valid, Pad) is (100,28)(50,14) i.e., 100 valid values followed by 28 pad values followed by 50 valid values and 14 pad values (14 additional pads). In this way, the layout propagator tracks this layout that allows the present invention to use only the STC+DP library (if needed) similar to earlier cases.

Also, there are "anywhere" padding implications to be considered. For example, in a first implication 1) if the padding can be present anywhere in the data stick, certain logic in a node (e.g., SAMV logic in a consumer node) becomes quite challenging In this case, the present invention enables and allows a producer of an input tensor to produce a desired padding value (e.g., using SAMV logic). The padding may be zero ("0") for most operation therefore is compatible, (1,+/−inf) for other operations). In common scenarios, this is possible such as, for example, in the inception module 500 of FIG. 5. In (uncommon) cases where, the padding in a producer may be complex (due to hierarchy of concatenations). When multiple consumers of the tensor require different padding values the padding in the producer is ambiguous. The layout propagator can identify this and schedule the operation on CPU.

In a second implication 2), tensors operating together should be compatible in terms of their tuple (Valid,Pad) stickification. For example, if the input activation to cony is Nin=150 with (100,28)(50,14) then the weight of the cony which uses Nin in a super-stick should be stickified the same pattern of padding. This is possible in scenarios where the tensor directly comes from a host. If both tensors are produced in an zAIU and are not (Valid,Pad) tuple compatible, then the layout propagator can identify and schedule the operation on the CPU.

In a third implication 3), memory and compute wastage may occur when one of the concatenated tensors is small enough to fit within a "padding" of the other tensor. For example, assume Input 1 is (100,28), Input 2 is (10,54) and the output is 192 elements with a padding of (100,28) (10,54) with 28+54=82 padded elements. The ideal output could have been (110,18) with only 18 padded elements. Thus, if too much memory and compute wastage occurs, then layout propagator can identify this condition and execute on CPU.

Figure 7:
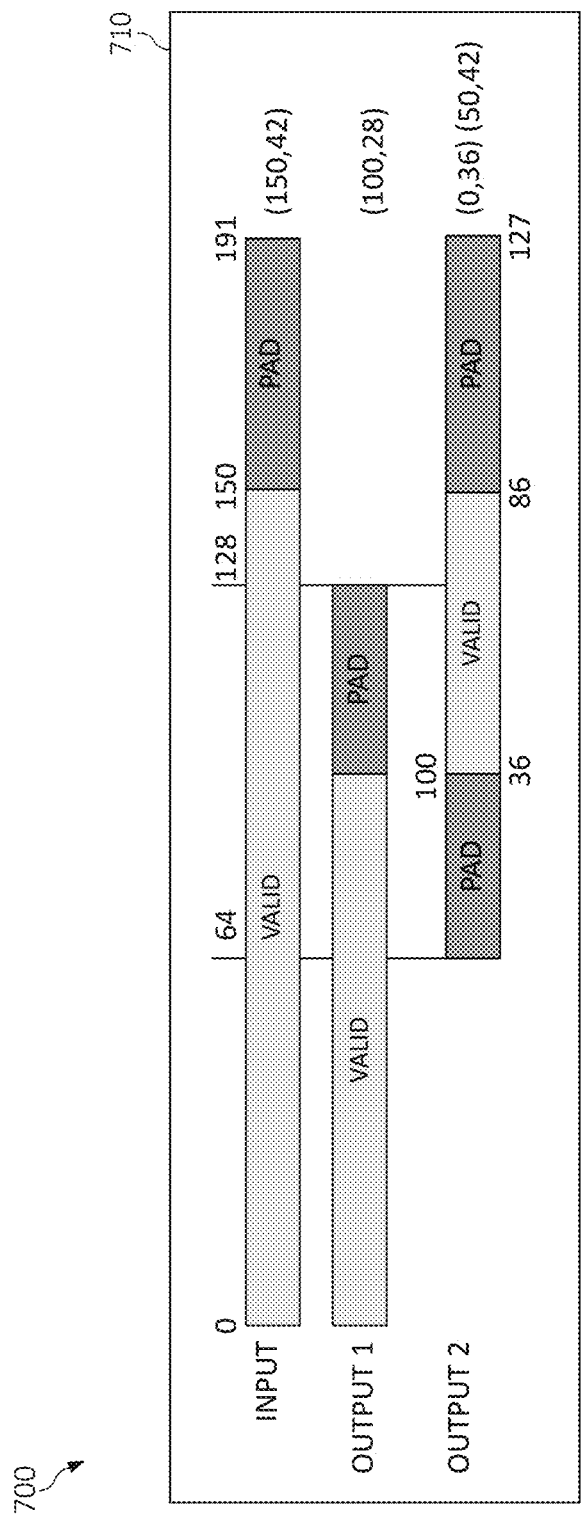
FIG. 7 is an additional block diagram depicting splitting, unstacking, and unpacking for stickification using anywhere padding to accelerate data manipulation on artificial intelligent hardware according to an embodiment of the present invention.

For further explanation, FIG. 7 is an additional block diagram 700 depicting splitting, unstacking, and unpacking for stickification using anywhere padding to accelerate data manipulation on artificial intelligent hardware according to an embodiment of the present invention. In one aspect, one or more of the components, modules, services, applications, and/or functions described in FIGS. 1-6 may be used in FIG. 7. As will be seen, many of the functional blocks may also be considered "modules" or "components" of functionality, in the same descriptive sense as has been previously described in FIGS. 1-6. Repetitive description of like elements employed in other embodiments described herein is omitted for sake of brevity.

As depicted, similar to the operations of concatenation, splitting, unstacking, and unpacking may be executed but in a reverse direction. For example, if a split "axis" dimension is outermost and not a stick dimension, the present invention may (i) turn into a NOP and (ii) the input tensor addresses is offset of a consumer operations.

If split "axis" dimension is an inner dimension but not a stick dimension, the STC+DP library can be used to splice each output as a separate tensor from a larger input volume (e.g., no dimension permute necessary).

If split axis (anywhere in the layout) is a stick dimension, the follow may be executed, as depicted in FIG. 7 with input 1, output 1, and output 2. For example, assume the split dimension is E1 and the input is E1=150 and the (Valid, Pad) is (150,42). The output 1 is E1=100 and the (Valid,Pair) is equal to (100,28) and output 2 is E1=50 and the (Valid, Pad) is (50,14). To avoid, intra-stick operation, the present invention may instead produce the outputs as output 1 (100, 28) having 100 valid entries followed by 28 zeros as desired. Output 2 is (0,36)(50,42) now with 36 pads upfront (e.g., part of the stick went to output 1), followed by 50 valid values and then 42 pad again. Also, output 2 uses additional stick that is necessary in E1 dimension (double the size).

In some implementations, a transpose operation may be executed on all the dimensions and only a dimension shuffling operation, which can be achieved by only moving sticks around in the tensor volume as long as the stick-layout of the output of the transpose is chosen to match the input of the consumer by the layout propagator. If a consumer of a transpose requires a different stick/super-stick, then a restickification is necessary. For example, assume the tensor [E4][E3][E2][E1] is transposed to [E4][E1][E2][E3] where (E1 is the stick and E2 is a super-stick. The stick format does not change in the CPU such as, for example, In zAIU is [E4][E3][E2][E1][E4][E1/64][E3][E2/32][32][64] and E1 is stick and the E2 super-stick is [E4][E1][E2][E3][E4][E3] [E1/64][E2/32][32][64] and E1 is stick and the E2 superstick.

It should be noted that for reshaping and squeezing (e.g., fusing dimensions), in a CPU execution, the reshape does not touch the tensor data. The reshaping and squeezing operations are used to re-interpret the data by 1) collapsing multiple adjacent dimensions into a single dimension, and/or 2) breaking/splitting a single dimension into more than one dimension (e.g., consider fusing and breaking dimensions cases separately)

For performing the reshape operation to reshape to fuse dimensions the following operations may be executed. For example, if dimensions that are fused appear in the same order in the stickified memory layout and none of dimensions are in the stick, the reshape operation is a NOP. If dimensions that are fused appear in different order in the stickified memory layout, but none of the dimensions are in the stick, the present invention permutes the dimensions to make them the same order and the STC+DP library can be used or the operations of FIG. 8 may be used.

Figure 8:
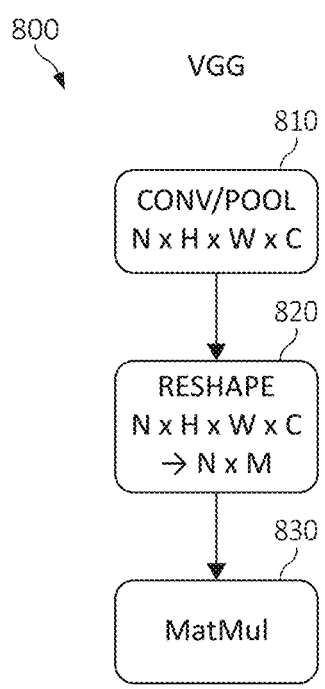
FIG. 8 is an additional block diagram depicting reshaping and squeezing dimensions of a tensor for stickification using anywhere padding to accelerate data manipulation on artificial intelligent hardware according to an embodiment of the present invention.

For further explanation, FIG. 8 is a block flow diagram depicting operations of reshaping and squeezing dimensions of a tensor for stickification using anywhere padding to accelerate data manipulation on artificial intelligent hardware according to an embodiment of the present invention. In one aspect, one or more of the components, modules, services, applications, and/or functions described in FIGS. 1-7 may be used in FIG. 8. As will be seen, many of the functional blocks may also be considered "modules" or "components" of functionality, in the same descriptive sense as has been previously described in FIGS. 1-7. Repetitive description of like elements employed in other embodiments described herein is omitted for sake of brevity.

If one of the dimensions that are fused appear in the stick and the stick dimension is the inner most dimension in the fusion, the present invention may provide "Anywhere padding" layout propagation to 1) turn the stick into a NOP if the dimension order (outside of the stick) matches the CPU order, and 2) dimension permute if the dimension order is different in zAIU compared to CPU using STC+DP library.

For example, consider a CPU having a cony/pool where a N×H×W×C dimensions, as in block 810 are reshaped, as in block 820, to NM where M=HWC. The zAIU layout is [N][C/64][H][W][64], where C is the stick dimension, and H is height, W is weight, and N is the Nth number of stick.

For example, consider the stick dimension C=100, H=4 W=2, which has a (Valid,Pad) of (100,28) along the stick dimension C. After the reshaping operation, assume it is desired that M is to be the stick dimension. In this example M=4*2*100=800, whose (Valid,Pad) is (800,32). However, with anywhere padding, the present invention can distribute the padding as follows: 128×8=1024 with (Valid,Pad) of (100,28)(100,28) up to 8 times. The implications of anywhere padding applies that a Pad to a specific value needs to be done by the producer operation since the dimension is unfused as per the producer. The weights of the Matmul 830 needs to stickified with "padding" in the middle.

Figure 9:
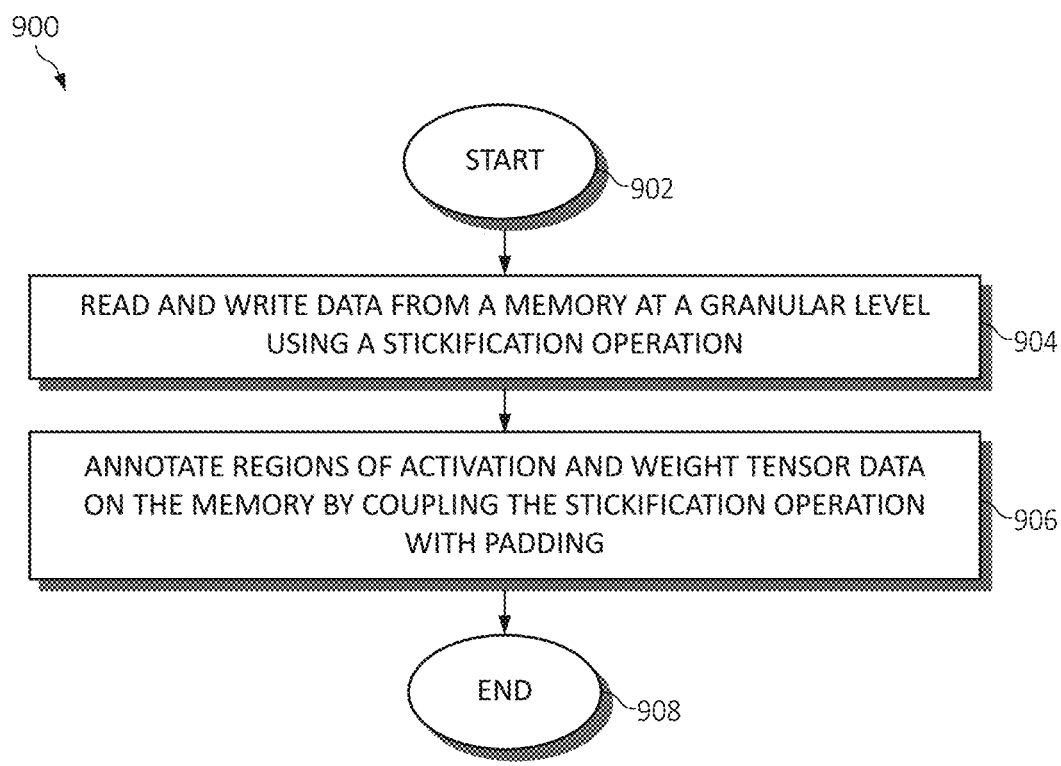
FIG. 9 is a flowchart diagram depicting an exemplary method for providing stickification using anywhere padding to accelerate data manipulation on artificial intelligent hardware in a computing environment, by a processor, in which aspects of the present invention may be realized.

For further explanations, FIG. 9 is a method 900 for providing stickification using anywhere padding to accelerate data manipulation on artificial intelligent hardware in a computing environment using a processor is depicted, in which various aspects of the illustrated embodiments may be implemented. The functionality 800 may be implemented as a method (e.g., a computer-implemented method) executed as instructions on a machine, where the instructions are included on at least one computer readable medium or one non-transitory machine-readable storage medium. The functionality 800 may start in block 802.

Data may be read from and written to a memory at a granular level using a stickification operation, as in block 904. One or more regions of activation and weight tensor data on the memory may be annotated by coupling the stickification operation with padding, as in block 906. The functionality 900 may end, as in block 908.

In one aspect, in conjunction with and/or as part of at least one blocks of FIG. 9, the operations of method 900 may include each of the following. The operations of 900 may unstick one or more inputs of a tensor; and restick the one or more inputs of the tensors.

The operations of 900 may divide one or more tensors in one or more of a plurality of dimensions. The operations of 900 may provide a padded region to be spread in a plurality of dimensions on a data stick.

The operations of 900 may transpose a tensor by shuffling a plurality of dimensions on a data stick, where the data stick format is unaltered. The operations of 900 may reshape one or more dimensions of the tensor into a single dimension or a plurality of dimensions. The operations of 900 may squeeze a dimension of a tensor having a size equal to a defined value.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing efficient realization of memory-bound operations a computing environment by one or more processors comprising:
   reading or writing data from a memory at a granular level using a stickification operation; and
   annotating regions of activation and weight tensor data on the memory by coupling the stickification operation with padding to accelerate data manipulation operations.

2. The method of claim 1, further including:
   unstickifying one or more inputs of a tensor; and
   restickifying the one or more inputs of the tensors.

3. The method of claim 1, further including dividing one or more tensors in one or more of a plurality of dimensions.

4. The method of claim 1, further including providing a padded region to be spread in a plurality of dimensions on a data stick.

5. The method of claim 1, further including transposing a tensor by shuffling a plurality of dimensions on a data stick, wherein the data stick format is unaltered.

6. The method of claim 1, further including reshaping one or more dimensions of the tensor into a single dimension or a plurality of dimensions.

7. The method of claim 1, further including squeezing a dimension of a tensor having a size equal to a defined value.

8. A system for providing efficient realization of memory-bound operations in a computing environment, comprising:
   one or more computers with executable instructions that when executed cause the system to:
   read or writing data from a memory at a granular level using a stickification operation; and
   annotate regions of activation and weight tensor data on the memory by coupling the stickification operation with padding.

9. The system of claim 8, wherein the executable instructions when executed cause the system to:
   unstick one or more inputs of a tensor; and
   restick the one or more inputs of the tensors.

10. The system of claim 8, wherein the executable instructions when executed cause the system to divide one or more tensors in one or more of a plurality of dimensions.

11. The system of claim 8, wherein the executable instructions when executed cause the system to provide a padded region to be spread in a plurality of dimensions on a data stick.

12. The system of claim 8, wherein the executable instructions when executed cause the system to transpose a tensor by shuffling a plurality of dimensions on a data stick, wherein the data stick format is unaltered.

13. The system of claim 8, wherein the executable instructions when executed cause the system to reshape one or more dimensions of the tensor into a single dimension or a plurality of dimensions.

14. The system of claim 8, wherein the executable instructions when executed cause the system to squeeze a dimension of a tensor having a size equal to a defined value.

15. A computer program product for providing efficient realization of memory-bound operations in a computing environment, the computer program product comprising:

one or more computer readable storage media, and program instructions collectively stored on the one or more computer readable storage media, the program instruction comprising:
- program instructions to read or writing data from a memory at a granular level using a stickification operation; and
- program instructions to annotate regions of activation and weight tensor data on the memory by coupling the stickification operation with padding to accelerate data manipulation operations.

16. The computer program product of claim 15, further including program instructions to:
- unstick one or more inputs of a tensor; and
- restick the one or more inputs of the tensors.

17. The computer program product of claim 15, further including program instructions to divide one or more tensors in one or more of a plurality of dimensions.

18. The computer program product of claim 15, further including program instructions to provide a padded region to be spread in a plurality of dimensions on a data stick.

19. The computer program product of claim 15, further including program instructions to transpose a tensor by shuffling a plurality of dimensions on a data stick, wherein the data stick format is unaltered.

20. The computer program product of claim 15, further including program instructions to:
- reshape one or more dimensions of the tensor into a single dimension or a plurality of dimensions; and
- squeeze a dimension of a tensor having a size equal to a defined value.

\* \* \* \* \*